US008840988B2

(12) United States Patent
Wohlmann et al.

(10) Patent No.: US 8,840,988 B2
(45) Date of Patent: Sep. 23, 2014

(54) FIBER PREFORM MADE FROM REINFORCING FIBER BUNDLES AND COMPRISING UNIDIRECTIONAL FIBER TAPES, AND COMPOSITE COMPONENT

(75) Inventors: Bernd Wohlmann, Dusseldorf (DE); Markus Schneider, Dusseldorf (DE); Andreas Woginger, Mannheim (DE); Frank Oberwahrenbrock, Wuppertal (DE)

(73) Assignee: Toho Tenax Europe GmbH, Wuppertal (DE)

( * ) Notice: Subject to any disclaimer, the term of this patent is extended or adjusted under 35 U.S.C. 154(b) by 13 days.

(21) Appl. No.: 13/988,216

(22) PCT Filed: Nov. 11, 2011

(86) PCT No.: PCT/EP2011/069939
§ 371 (c)(1),
(2), (4) Date: May 17, 2013

(87) PCT Pub. No.: WO2012/072405
PCT Pub. Date: Jun. 7, 2012

(65) Prior Publication Data
US 2013/0244018 A1  Sep. 19, 2013

(30) Foreign Application Priority Data
Dec. 2, 2010 (EP) .................................. 10193489

(51) Int. Cl.
*B32B 27/04* (2006.01)
*B29C 70/88* (2006.01)
*B29C 70/08* (2006.01)
*B29B 11/16* (2006.01)
*D04H 13/00* (2006.01)
*B29K 707/04* (2006.01)

(52) U.S. Cl.
CPC ............ *D04H 13/00* (2013.01); *B29K 2707/04* (2013.01); *B29C 70/887* (2013.01); *B29C 70/081* (2013.01); *B29B 11/16* (2013.01)
USPC ................... 428/297.4; 428/299.7; 428/292.1

(58) Field of Classification Search
CPC .... B29B 11/16; B29C 70/081; B29C 70/887; D04H 13/00; B29K 2707/04
USPC .......................... 428/292.1, 297.4, 299.7, 221
See application file for complete search history.

(56) References Cited

U.S. PATENT DOCUMENTS 5,151,322 A * 9/1992 Kimoto et al. ............. 428/299.1
7,867,612 B2 * 1/2011 Schwung et al. ............. 428/375
(Continued)

FOREIGN PATENT DOCUMENTS

DE          38 43 535 A1     6/1990
DE   10 2007 012 608 B4   12/2009
(Continued)

OTHER PUBLICATIONS

DIN EN 2564:1998, pp. 1-10, Aug. 1998.
(Continued)

*Primary Examiner* — N. Edwards
(74) *Attorney, Agent, or Firm* — Oliff PLC

(57) ABSTRACT

A fiber preform for producing fiber composite structures, a wall thereof including a first zone made from reinforcing fiber bundles having a first resin composition and a second zone made from at least one fiber tape comprising at least one unidirectionally directed reinforcing yarn strand having a second resin composition. The reinforcing fiber bundles in the first zone are oriented in different spatial directions to each other when viewed in a direction parallel to the extension of the thickness. Each reinforcing fiber has a length of from 3 to 50 mm, and contains the first resin composition in a concentration of from 1 to 10 wt % of the fiber weight. The wall of the fiber preform has a proportion of reinforcing fibers of more than 35 vol %, and the second zone forms a discrete region when viewed in a direction perpendicular to the thickness extension of the wall.

17 Claims, 2 Drawing Sheets

(56) References Cited

U.S. PATENT DOCUMENTS

| | | | |
|---|---|---|---|
| 8,012,567 B2 * | 9/2011 | Gaides et al. | 428/172 |
| 8,273,454 B2 * | 9/2012 | Schneider et al. | 428/364 |
| 8,354,156 B2 * | 1/2013 | Taketa et al. | 428/113 |
| 2007/0196636 A1 | 8/2007 | Schneider et al. | |
| 2008/0085650 A1 | 4/2008 | Hartman | |
| 2009/0014119 A1 | 1/2009 | Wohlmann et al. | |
| 2009/0104418 A1 * | 4/2009 | Ohki et al. | 428/213 |
| 2009/0229761 A1 | 9/2009 | Joern et al. | |
| 2010/0028543 A1 * | 2/2010 | Davis et al. | 427/372.2 |
| 2010/0108252 A1 | 5/2010 | Gessler et al. | |
| 2010/0126652 A1 | 5/2010 | Joern et al. | |
| 2013/0095282 A1 * | 4/2013 | Taketa et al. | 428/113 |
| 2013/0244018 A1 * | 9/2013 | Wohlmann et al. | 428/299.7 |

FOREIGN PATENT DOCUMENTS

| | | |
|---|---|---|
| EP | 0 361 796 B1 | 4/1990 |
| EP | 1 134 314 A1 | 9/2001 |
| EP | 1 352 118 B1 | 10/2003 |
| WO | WO 98/10128 A1 | 3/1998 |
| WO | WO 98/22644 A1 | 5/1998 |
| WO | WO 98/29232 A1 | 7/1998 |
| WO | WO 00/43191 A1 | 7/2000 |
| WO | WO 2005/095080 A1 | 10/2005 |
| WO | WO 2007/101578 A2 | 9/2007 |
| WO | WO 2010/139007 A1 | 12/2010 |

OTHER PUBLICATIONS

Campbell, "Manufacturing Processes for Advanced Composites," Elsevier, pp. 39-62, 2004.

Mar. 19, 2012 International Search Report issued in International Application No. PCT/EP2011/069969 with English-language translation.

* cited by examiner

FIBER PREFORM MADE FROM REINFORCING FIBER BUNDLES AND COMPRISING UNIDIRECTIONAL FIBER TAPES, AND COMPOSITE COMPONENT

BACKGROUND

The present invention relates to a fiber preform for producing fiber composite structures or composite components, the wall thereof being made of reinforcing fibers, as well as to a composite component made from this type of fiber preform.

Components made from fiber composite materials are increasingly used, especially in the aerospace industrial sectors, yet also e.g. in machine building industry. Fiber composites often offer the advantage of lower weight and/or higher strength over metals. An essential aspect thereby is the inexpensive production of this type of resilient and yet lightweight composite components at the same time. In view of the resilience, i.e. the rigidity and strength, the volume percent of the reinforcing fibers and especially also the direction of the reinforcing fibers have a determining effect on composite components.

A commonly used manufacturing method is currently based on the so-called prepreg technology. In this case, the reinforcing fibers, such as glass fibers or carbon fibers, are arranged for example parallel to one another, embedded in a matrix resin, and processed into sheet-like semi-finished products. For component manufacture, these sheets are cut according to the component contour and laminated into a tool by machine or by hand layer-by-layer while taking into account the orientation of the reinforcing fibers as required by the component load. Subsequently, the matrix is cured under pressure and at temperature in an autoclave. This type of manufacturing process is, however, very complex and expensive for many components.

In a further method, so-called fiber preforms are produced from reinforcing fibers. Essentially, these are textile semi-finished products in the shape of two- or three-dimensional configurations made from reinforcing fibers, in which, in further steps for producing the fiber composite component, a suitable matrix material is introduced via infusion or injection, also by application of vacuum. Subsequently, the matrix material is cured at, as a rule, increased temperatures and pressures into the finished component. Known methods for infusion or injection of the matrix material in this case are the so-called liquid molding (LM) method, or methods related thereto such as resin transfer molding (RTM), vacuum assisted resin transfer molding (VARTM), resin film infusion (RFI), liquid resin infusion (LRI), or resin infusion flexible tooling (RIFT). The fiber material used to produce the fiber preforms can also already be impregnated e.g. with low amounts of a curable plastic material, i.e. a binder material, in order to improve the fixing of the reinforcing fibers in the fiber preform. Pre-impregnated yarns of this type are described for example in WO 2005/095080.

In order to produce such fiber preforms, WO 98/22644 has already suggested dispersing short-cut reinforcing fibers together with a binder material on an air-permeable screen adapted to the shape of the desired fiber preform and maintaining said fibers on the screen through the application of vacuum until, after cooling of the binder material, a sufficient stability of the preform is achieved. By means of this procedure, the reinforcing fibers are arranged in random, isotropic arrangements and directions. This is indeed advantageous if the load directions in the component cannot be predicted in advance; however, it has the simultaneous disadvantage that, due to the isotropic orientation, only a fraction of the fibers lie in the load direction. An adaptation to special load directions in the component is thus not possible when using this method. Reinforcements in the component wall can, at most, be made via e.g. locally increased wall thicknesses; however they are associated with an increase in weight of the component. In addition, according to the examples of WO 98/22644, only fiber volume proportions in the range of up to approximately 15 vol. % are achieved, and therefore, due to the low fiber volume proportions, only comparably low thickness-related component strengths. Usually, fiber proportions of a maximum of 30 vol. % are achieved for components of this type having random orientation of the reinforcing fibers.

In US 2010/0126652 A1 and US 2009/0229761 A1, a method and a device, respectively, for producing fiber preforms are described, by means of which it is possible to satisfy the demand for a load-appropriate fiber direction in the component. In this case, a so-called TFP method ("tailored fiber placement method") is used, in which yarns or fiber strands are laid along any number of paths adapted to the distribution of forces affecting the finished component and pre-fixed using fixing threads, wherein CNC controlled sewing and knitting machines are used therefor. US 2009/0229760 A1 describes an application device for the fiber strands suitable for a TFP method of this type. Using these TFP methods, an improved utilization of the mechanical resistance of the reinforcing fibers and an increased adaptation of the component cross sections to the respective local loads in the component are possible. However, these methods, in particular in the production of fiber preforms with complex, three dimensional structures, are complex and cost intensive.

As an alternative to fixing the fiber strands by means of a textile method, such as by means of sewing or knitting methods, the fiber strands can also be fixed by means of a thermally activated binder material, for example by means of a thermoplastic, as is described in DE 10 2007 012 608 B4.

A further possibility for the production of fiber preforms consists in the use of so-called multiaxial non-crimp fabrics. Multiaxial non-crimp fabrics are understood to be structures made from a plurality of superimposed fiber layers, wherein the fiber layers comprise sheets of reinforcing yarns arranged parallel to each another. The superimposed fiber layers can be connected and secured to each other via a plurality of sewing or knitting threads arranged side-by-side and running parallel to each other and forming stitches, such that the multiaxial non-crimp fabrics is stabilized in this way. The fiber layers are superimposed such that the reinforcing fibers of the layers are directed parallel to each other or alternately crosswise (e.g. −45°; 0°, +45°.

Multiaxial non-crimp fabrics of this type are laid without matrix material in a mold and e.g. for shaping are adapted to its contours using increased temperature. Subsequently, the matrix material required for the production of the composite component is introduced into the mold and into the fiber preform via infusion or injection, whereby, following curing of the matrix material, the composite component is obtained. Multiaxial non-crimp fabrics and the use thereof to produce fiber preforms are described for example in EP 0 361 796 B1, EP 1 352 118 B1, or WO 98/10128.

Multiaxial non-crimp fabrics are, however, expensive to produce, and are generally produced in standard widths, which seldom correspond to the dimensions of the later component. This results in a not insignificant amount of waste. In addition, especially in components with complex contours and particularly with respect to components with small radii of curvature, they can only be used to a limited extent, as the multiaxial non-crimp fabrics cannot be draped into any form. Further, it was observed that the sewing or knitting threads can often lead to a reduction in the impact strength of the resulting composite. Finally, the later infusion or injection of the matrix material can also be slowed down over the liquid molding or related methods.

To avoid seams and transverse filaments, US 2008/0085650 A1 suggests using reinforcing material structures having a layered construction, said reinforcing material structures comprising a layer of continuous reinforcing fibers directed in parallel as well as a layer made from e.g. a nonwoven, a woven fabric, or from short cut fibers, wherein the layers are connected to each other via an adhesive or via adhesive points. These materials are also initially available in standard widths, which have to be cut corresponding to the component geometry. In this way, increased costs occur due to additional steps, for example cutting, draping, and connecting, as well as an average waste of up to 30% of the output material.

SUMMARY

It is the object of the present invention to provide a fiber preform which can find use in a plurality of component contours, in which in particular an improved adaptation to the respective local loads in the component is possible, and which can be inexpensively produced.

The object is achieved by a fiber preform for producing fiber composite structures, the wall thereof being made from reinforcing fibers, wherein the wall has a first surface, a second surface lying opposite the first surface and a thickness extending between the surfaces, and is limited by edges, wherein the wall comprises at least one first zone made from reinforcing fiber bundles having a first resin composition and at least one second zone made from at least one fiber tape comprising at least one unidirectionally directed reinforcing yarn strand having a second resin composition, wherein the reinforcing fiber bundles in the at least one first zone are oriented in differing spatial directions from each other when viewed in a direction parallel to the thickness extension, wherein each reinforcing fiber bundle comprises reinforcing fiber filaments directed parallel to each other, has a length in the range from 3 to 50 mm, and contains the first resin composition in a concentration in the range from 1 to 10 wt. % relative to the fiber weight, wherein the wall of the fiber preform has a proportion of reinforcing fibers of greater than 35 vol. %, and wherein the at least one second zone forms a discrete region when viewed in a direction perpendicular to the thickness extension of the wall and at least one fiber tape ends with at least one end thereof inside of the wall.

By means of the fiber preform according to the invention, a fiber composite structure or a composite component can be produced in a simple way. In this case, the fiber preform according to the invention can be laid in a near-net-shape mold by means of common methods, a matrix material is introduced into the mold and thus into the fiber preform via infusion, infiltration, or injection, and subsequently the composite component is formed by curing the matrix material. The invention therefore also relates to a composite component, the wall thereof being constructed from reinforcing fibers embedded in a polymer matrix, wherein the wall has a first surface, a second surface lying opposite the first surface and a thickness extending between the surfaces, and is limited by edges, wherein the wall comprises at least one first zone made from reinforcing fiber bundles and at least one second zone made from at least one fiber tape comprising at least one unidirectionally directed reinforcing yarn strand, wherein the reinforcing fiber bundles in the at least one first zone are oriented in differing spatial directions from each other when viewed in a direction parallel to the thickness extension, wherein each reinforcing fiber bundle comprises reinforcing fiber filaments directed parallel to each other and has a length in the range from 3 to 50 mm, wherein the wall of the fiber preform has a proportion of reinforcing fibers of greater than 35 vol. %, and wherein the at least one second zone forms a discrete region when viewed in a direction perpendicular to the thickness extension of the wall and at least one fiber tape ends with at least one end thereof inside of the wall.

DETAILED DESCRIPTION OF EMBODIMENTS

The fiber preform or the composite component has thus inside of the wall thereof at least one first zone made from reinforcing fiber bundles and at least one second zone made from at least one fiber tape. In this case, the first zone inside of the wall can form a continuous region over the entire wall, in which e.g. one or more second zones are embedded. The second zones can thereby be arranged inside of the wall, i.e. forming islands when viewed perpendicular to the thickness extension of the wall. The second zones can, however, in a preferred embodiment, also be arranged in the region of one of the surfaces on the first zone, i.e. in this case at least one fiber tape is mounted, for example, on one of the surfaces. It is, however, also possible that a second zone extends over the entire wall thickness and is thereby laterally limited by first zones. In each case, the at least one second zone forms a discrete region when viewed in a direction perpendicular to the thickness extension of the wall, i.e. the at least one second zone does not form a continuous region over the entire wall when viewed in this direction. As previously explained, only the at least one first zone can extend over the entire wall as a continuous region. In a preferred embodiment of the fiber preform according to the invention, the at least one first zone inside of the wall forms, over the entire wall, a continuous region made from reinforcing fiber bundles and the wall comprises at least one discrete second zone arranged in and/or on the continuous region made from reinforcing fiber bundles.

In the at least one first zone, the reinforcing fiber bundles are oriented in different spatial directions from each other when viewed in a direction parallel to the thickness extension, i.e. the reinforcing fibers are distributed or oriented isotropically in the at least one first zone in the spatial directions perpendicular to the thickness extension. Isotropically is thereby understood as meaning that, while there is an anisotropic orientation of the fibers within the individual reinforcing fiber bundles, the bundles in their totality show no preferred orientation but are isotropically oriented in the cited spatial directions. In particular with regard to thicker walls or thicker layer thicknesses of the first zones, there can also be an isotropic distribution taking into account the spatial direction extending in the direction of the thickness of the wall, i.e. the fiber preform or the composite component can have an isotropic structure in all three spatial directions in the at least one first zone.

According to the invention, each reinforcing fiber bundle comprises reinforcing fiber filaments directed parallel to each other and has a length in the range from 3 to 50 mm. Preferably, the length lies in the range from 10 to 50 mm. In view of the attainable proportions of reinforcing fibers in the at least one first zone, in particular for achieving proportions above 40 vol. %, it is advantageous if the wall of the fiber preform or of the composite component according to the invention has a plurality of groups of reinforcing fiber bundles having differing lengths in the at least one first zone, such that overall the lengths of the reinforcing fiber bundles have a distribution. For example, reinforcing fiber bundles having a length of 20, 30, and 50 mm can be or are combined with each other.

The reinforcing fiber bundles can comprise common filament yarns having e.g. 500 to 50,000 reinforcing fiber filaments. It is, however, advantageous if each reinforcing fiber bundle comprises 500 to 24,000 reinforcing fiber filaments. To achieve a most homogeneous distribution of the reinforcing fiber bundles in the at least one first zone, and to achieve the highest possible fiber proportions, the number of reinforcing fiber filaments in the reinforcing fiber bundles lies particularly preferably in the range from 500 to 6,000 and more particularly preferably in the range from 1,000 to 3,000.

To achieve high fiber volume proportions in the at least one first zone, in particular to achieve proportions of reinforcing fibers above 40 vol. %, it has likewise proven to be advantageous if the wall has a plurality of groups of reinforcing fiber bundles having differing numbers of reinforcing fiber filaments, because this allows the realization of high packing densities of the bundles in the at least one first zone. For example, reinforcing fiber bundles having 3,000, 6,000, and 12,000 reinforcing fiber filaments can be combined.

To achieve high packing densities of the bundles, i.e. to achieve high fiber volume proportions in the at least one first zone of more than 40 vol. %, it is further advantageous if the reinforcing fiber bundles have a cross section that is as flat as possible perpendicular to the extension of the reinforcing fiber filaments in the bundle. Preferably, the reinforcing fiber bundles are strip shaped and have a ratio of bundle width to bundle thickness of at least 25. Particularly preferably, the ratio of bundle width to bundle thickness lies in the range of 30 to 150.

Through suitable selection of reinforcing fiber bundles with respect to the ratio of bundle width to bundle thickness, with respect to the length, as well as with respect to the number of reinforcing fiber filaments, especially high packing densities of the reinforcing fiber bundles and thus especially high fiber volume proportions can be realized in the at least one first zone. In a more particularly preferred embodiment of the fiber preform or the composite component, the reinforcing fiber bundles arranged in the region of the at least one first zone in the wall of the fiber preform or of the composite component have, in addition to a flat cross section, differing lengths and differing numbers of reinforcing fiber filaments. This leads to especially high fiber volume proportions in the wall of the preform or component. According to the invention, the wall of the fiber preform or of the composite component has across its entire extension, i.e. at every point of its extension, a proportion of reinforcing fibers of at least 35 vol. %, preferably a proportion of reinforcing fibers of at least 40 vol. %, and particularly preferably of 45 vol. %. It is especially advantageous if the proportion of reinforcing fibers amounts to at least 50 vol. % because this leads to superb mechanical properties in the composite component. The pre-impregnation of the reinforcing fiber bundles with the first resin composition thereby allows for a compact, stable laying of these reinforcing fiber bundles during the production of the fiber preform, by which means the realization of such high fiber volume proportions is supported.

The proportion of reinforcing fibers in the wall of the fiber preform can be determined following DIN EN 2564:1998. For this purpose, the fiber preform is impregnated according to usual methods with an epoxy resin such as HexFlow RTM 6 (Hexcel) and cured into a composite material. Test bodies are cut from the cured composite material, from which mass and density are determined according to DIN EN 2564:1998, as well as, after treatment with concentrated sulfuric acid to separate the matrix resin, the mass of the fibers contained in the test bodies.

According to the provisions of DIN EN 2564:1998, the fiber mass proportion can thus be determined and, resulting therefrom, the fiber volume proportion or the proportion of reinforcing fibers. This method can also be used to determine the fiber volume proportion for the composite components.

The reinforcing fiber bundles in the fiber preform have inventively a content of a first resin component in the range of 1 to 10 wt. % in relation to the fiber proportion. By this means, a sufficient stability is provided to the fiber bundles and a disintegration into individual filaments or individual groups of filaments is avoided. At the same time, use of the resin applications according to the invention guarantees that the reinforcing fiber bundles adhere to each other during the formation of the fiber preform and the fiber preform thus achieves a sufficient stability for additional handling. A resin application of this type is often designated as a binder or as a binding. As has already been explained, the actual matrix material still required for the formation of the composite component is introduced in a later process step by infusion or injection into the preform. Preferably, the reinforcing fiber bundles in the fiber preform contain the first resin composition in a concentration in the range from 2 to 7 wt. % in relation to the fiber proportion.

With regard to the first resin composition, this can be binder material that fulfills the above-mentioned object. In a preferred embodiment of the invention, the first resin composition is a thermally activatable binder material, for example a thermoplastic. However, preferably the binder material is based on epoxy resins, wherein the binder material can be multiply melted and can be converted to a fixed state by cooling to room temperature. Resin compositions of this type, or reinforcing fibers that have these types of resin compositions, are disclosed for example in WO 2005/095080. WO 98/22644 also discloses these types of resin compositions suitable as binders.

The at least one fiber tape on or inside of the at least one first zone and thus the at least one second zone itself is arranged e.g. in regions of especially high strain in the subsequent component produced from the fiber preform or in the composite component according to the invention and is correspondingly oriented to the stress directions prevailing there. The at least one fiber tape is thus preferably arranged in orientation with the forces or directed in accordance with the load in the wall of the fiber preform or of the composite component. Thereby, the at least one fiber tape or the fiber tapes can extend from one side or edge of the wall of the fiber preform or of the composite component to another side or edge of the fiber preform or of the composite component and thus over the entire extension in this region. The edges can thereby define the outer perimeter of the fiber preform; however they can also appear in the inside of the fiber preform by means of recesses, openings, projections, among others.

The fiber preform according to the invention distinguishes itself especially in that it can be flexibly adapted to local loads in the component to be produced from the fiber preform. Therefore, the fiber preform has in one embodiment at least one fiber tape which ends with at least one of the ends thereof inside the wall, and said fiber tape thus does not extend from one edge of the fiber preform to another edge. A fiber tape or a plurality of fiber tapes thus extend only over parts of the respective expansion or extension of the wall in the direction of this one fiber tape, or these fiber tapes, thus forming island-shaped or peninsula-shaped regions. The ends of a fiber tape thereby correspond to the ends of at least one unidirectionally directed reinforcing yarn strand forming this fiber tape. For example, it is also possible, in the case that a fiber preform or a composite component has a projection for forming a fitting, that fiber tapes are applied as reinforcement only in the region of the projection. The fiber tapes or at least one fiber tape can thereby also be applied or run in a curved path.

Preferably the at least one fiber tape has a length of at least 7 cm and especially preferably of at least 10 cm. At shorter lengths, the force transmission into the fiber tapes in a component is insufficient. In addition, the handling of shorter fiber tapes, in particular in automated laying, as is described for example in DE 10 2007 012 608 B4, is difficult. The at least one fiber tape has especially preferably a length of at least 20 cm. As previously explained, an upper limit of the fiber tape length results from the component geometry in individual cases.

The at least one fiber tape can e.g. comprise one single multifil reinforcing yarn that is spread and laid flat, i.e. one single reinforcing yarn strand. Preferably, however, the at least one fiber tape comprises a plurality of reinforcing yarn strands arranged side-by-side and parallel to each other.

In an embodiment of the fiber preform according to the invention or the composite component, the at least one second zone can thereby comprise one individual fiber tape, which can also comprise a plurality of multifil reinforcing yarns applied next to and over each other. Preferably, however, the at least one second zone comprises a plurality of fiber tapes arranged in layers over each other, wherein the number of the layers as well as their width results from the respective loads in the subsequent component.

As explained, due to the specific construction of the fiber preform according to the invention, a load-appropriate construction of the fiber preform as well as of the components produced therefrom is possible in a simple way. This is achieved herein in that the at least one fiber tape is preferably arranged in the wall of the fiber preform or of the composite component in orientation with the forces, or directed in a load-appropriate way. In one embodiment, therefore, the wall of the fiber preform or of the composite component comprises at least two fiber tapes and the orientation of the at least one unidirectionally directed reinforcing yarn strand of at least one fiber tape is different from the orientation of the at least one unidirectionally directed reinforcing yarn strand of another fiber tape. In one embodiment, inside of a second zone, fiber tapes which are arranged in layers over each other, or the unidirectionally directed reinforcing yarn strands within and forming said fiber tapes, can thereby have different orientations. In a further embodiment, in the case of a plurality of second zones on and/or in the wall of the fiber preform or of the composite component, fiber tapes of different second zones, or the unidirectionally directed reinforcing yarn strands of different second zones within and forming the fiber tapes, can have different orientations. The differently oriented reinforcing yarn strands can form for example an angle $\alpha$ in the range of 5° to 175°, and preferably 20° to 160° to each other. This naturally also comprises embodiments in which fiber tapes inside of one second zone and those of different second zones have differing orientations to each other.

In a further preferred embodiment, at least one unidirectionally directed reinforcing yarn strand of at least one fiber tape, or at least one fiber tape, in respect to the longitudinal extension thereof, is not directed parallel to any of the edges of the fiber preform or of the composite component.

According to the invention, the unidirectionally directed reinforcing yarn strands or the at least one fiber tape have a second resin composition. By this means, a secure laying and fixing of the at least one fiber tape is enabled and a stabilization of the fiber preform is achieved. Depending on the application, the fiber tape can be a so-called unidirectional prepreg, in which the unidirectionally oriented reinforcing fibers are already impregnated with matrix resin and the concentration of the matrix resin in the prepreg already substantially corresponds to the concentration in the component, i.e. in the range from approximately 25 to 45 wt. %. Preferably, however, the at least one fiber tape of the fiber preform according to the invention has the second resin composition in a concentration of 1 to 10 wt. % relative to the fiber proportion. The second resin composition then functions likewise as a binder material. At concentrations of this type, the previously mentioned good handling and fixing are guaranteed on the one hand. On the other hand, the at least one fiber tape has a sufficient flexibility and there is a good infiltration with the matrix resin during the subsequent component processing.

The proportion of reinforcing fibers in the at least one fiber tape of the at least one second zone of the fiber preform should be lower than 70 vol. % so that in the finished component after the infiltration with matrix resin a substantially complete embedding of the reinforcing fibers in the matrix resin is guaranteed. On the other hand, the proportion of fibers should be as high as possible so that a highest possible reinforcing effect is achieved at the given volume. Not least, but also under consideration of the practical handleability, the volume proportions of reinforcing fibers in the at least one fiber tape of the fiber preform or of the composite component have been shown to be suitable in the range from 40 to 65 vol. % and preferably in the range from 50 to 65 vol. %.

With regard to the second resin composition, it can, like the first resin composition, be a thermally activatable binder material, for example, a thermoplastic. A binder material based on epoxy resins is likewise preferred, wherein the binder material can be multiply melted and can be converted to a fixed state by cooling to room temperature. Also, with regard to the second resin composition or with regard to the fiber tapes which have these resin compositions, the yarns and resin compositions disclosed for example in WO 2005/095080 can be considered. Preferably, the first resin composition and the second resin composition are chemically similar and especially preferably identical. Suitable resin compositions or binder materials are also described e.g. in the already mentioned WO 98/22644.

With regard to the reinforcing fibers or reinforcing fiber yarns used in the fiber preform according to the invention or the composite component according to the invention, said fibers or yarns can be those based on carbon, glass, aramid, ceramics, boron, steel or on synthetic polymers like polyamide, polyhydroxy ether, polyethylene, in particular UHMW polyethylene, or polyester, or a combination of these materials, for example in the form of mixed yarns (co-mingled yarns). In a preferred embodiment, the reinforcing fibers of the reinforcing fiber bundles and/or the reinforcing yarn strands of the at least one fiber tape are carbon fibers. In this case, the carbon fibers can be those that are obtained from pitch, polyacrylonitrile or viscose pre-products.

The combination of isotropically directed reinforcing fiber bundles and fiber tapes or reinforcing yarn strands directed in orientation with the forces allows for an inexpensive production of fiber preforms, which production can simultaneously be adapted to the specific loads in the subsequent component. Thus, the first zones can be inexpensively formed with reinforcing fiber bundles e.g. via so-called fiber spraying processes, in which reinforcing fiber yarns applied with the first resin composition are fed to a cutting head, cut to correspondingly measured bundles having the desired length, and finally sprayed into a tool adapted to the final contours of the fiber preform. Alternatively, a fill made of corresponding reinforcing fiber bundles can also be deposited in the tool. In both cases, the positioning of the reinforcing fiber bundles can be supported through the application of vacuum to the tool, which is perforated in this case.

At the same time, or also e.g. subsequently, in regions in which there will be increased load in the subsequent component, fiber tapes can be applied oriented in the direction of the loads, wherein for this purpose known methods from the prior art can be used, like the application method disclosed in WO 2007/101578 using a flame spraying method to deposit the second resin composition during the application, or the method disclosed in DE 10 2007 012 608 B4 in which the fiber tapes or the reinforcing fiber strands, which are provided with a thermally activatable binder material, for example with a thermoplastic, thus a second resin composition, are positioned by means of an automated application device over a laying head. Methods of this type are also known under the designation "fiber placement methods".

In this way, in contrast to the fiber preforms of the prior art, fiber preforms having in principle any possible flat or two-dimensional surface geometry, or preferably having a three-dimensional surface geometry diverging from the flat surface geometry, can be produced by means of the present invention. The preform according to the invention and also the composite component according to the invention can have different wall thicknesses over the extension of the wall thereof or also projections, openings, etc. A preferred fiber preform therefore has in particular different wall thicknesses in the region of the at least one first zone.

By this means the fiber preform according to the invention or the composite component according to the invention can be available in a plurality of different embodiments. By flexibly controlling the first and second zones in relation to each other, a simple adaptation to the loads in the component can be obtained. Thus, according to load locations, an adaptation can be effected through increasing the wall thickness via additional proportions of first zones, i.e. by adding reinforcing bundles. Likewise, a reinforcement is possible in specific regions via second zones having fiber tapes oriented in the direction of load. By this means, depending on the specific component or depending on the specific fiber preform, the proportion of first zones having reinforcing fiber bundles can outweigh the proportion of second zones having fiber tapes made of reinforcing yarn strands, or vice versa. Key to determining the embodiment in this case are the predicted loads in the final component as well as the goals to be achieved with respect to e.g. wall thicknesses, weight, volume, etc. and not the least also with respect to the manufacturing costs of the component.

The invention will now be described in more detail by way of the following figures, wherein the figures shall have no limiting character. In simplified schematic representation:

DETAILED DESCRIPTION OF DRAWINGS

Figure 1:
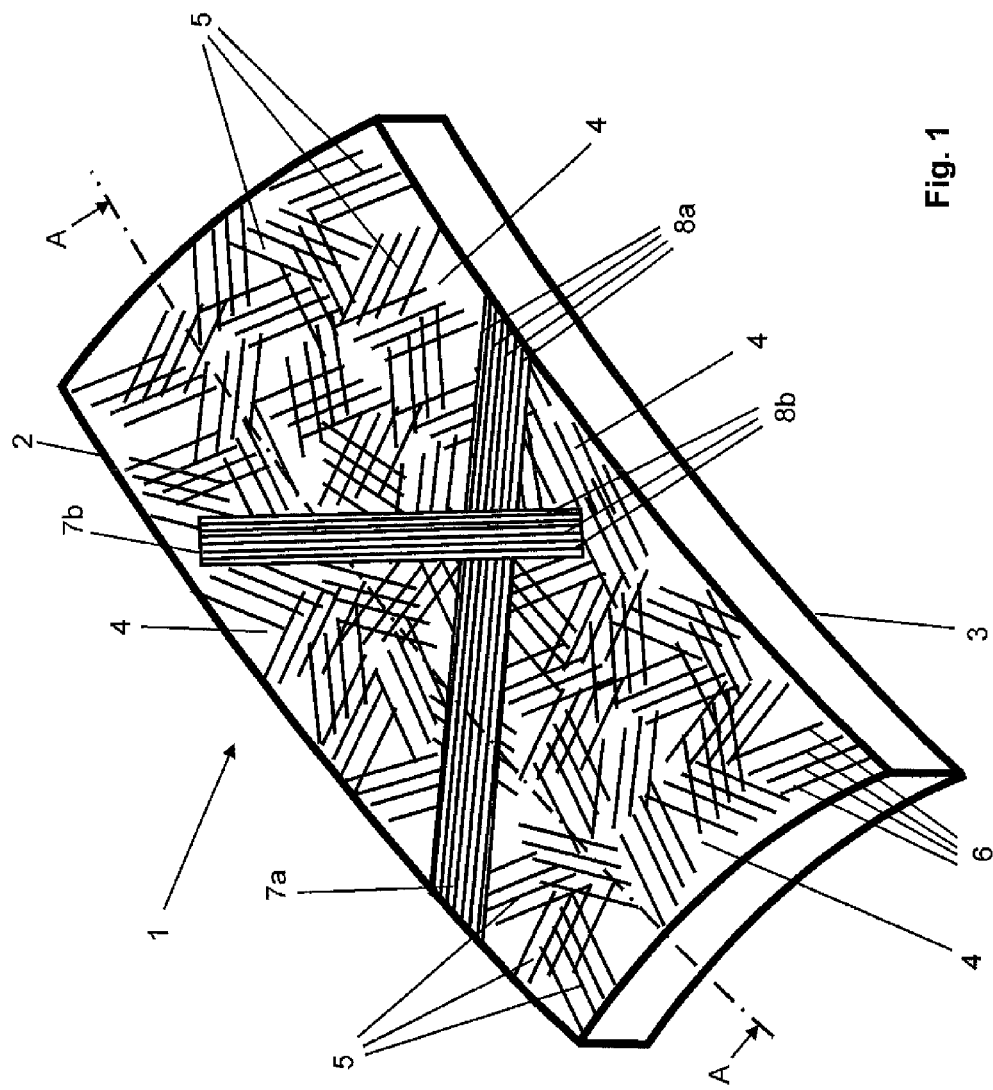
FIG. 1 shows a top view of an fiber preform according to the invention in the shape of a curved calotte segment.

FIG. 1 schematically shows a fiber preform 1 in the shape of a curved calotte segment having a first surface 2 and a second surface 3 and a thickness extending between the surfaces. From a top view of the first surface 2, the first zones 4 made from reinforcing fiber bundles 5 can be recognized, said bundles being, on average, isotropically oriented in different directions. The reinforcing fiber bundles 5 are constructed from short-cut reinforcing filaments 6 that run parallel to each other, wherein the number of reinforcing fiber filaments in the bundle can lie in the range from 500 to 50,000. The reinforcing fiber bundles 5 are provided with a first resin composition by which means a good adhesion of the reinforcing fiber bundles to each other is achieved and the fiber preform obtains sufficient stability for further handling.

In the present example, the fiber preform 1 has two second zones 7a, 7b on its first surface 2 in the form of fiber tapes that comprise unidirectionally directed reinforcing yarn strands 8a, 8b. In the example shown, the second zone 7a extends over the surface 2 from one edge to the opposing edge, while the second zone 7b only runs over a segment of the surface and ends inside of the wall. The reinforcing yarn strands 8a, 8b of the second zones 7a, 7b are oriented in different directions and are not directed parallel to any of the edges of the fiber preform.

Figure 2:
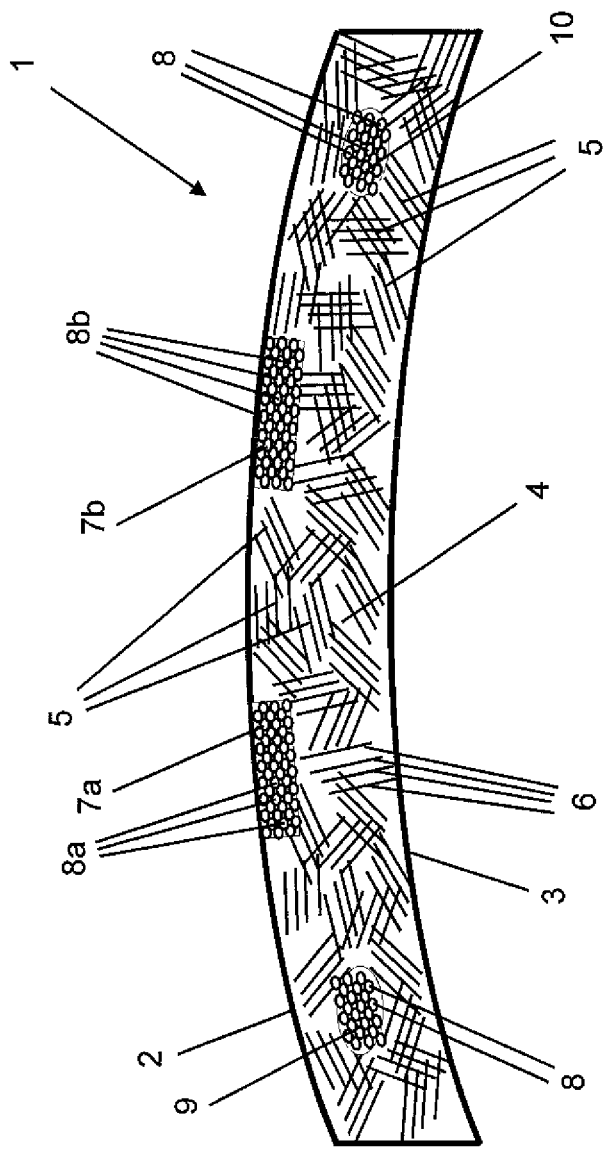
FIG. 2 shows a cross-section through the fiber preform segment shown in FIG. 1 along the line A-A.

FIG. 2 shows a cross-section through the fiber preform segment schematically represented in FIG. 1. Therefore, the same parts are provided with the same reference numbers. The fiber preform 1 is present as a curved segment having a first surface 2 and a second surface 3, between which extends the thickness of the wall of the fiber preform. The wall is constructed from a first zone 4 and second zones 7a, 7b, 9, 10, wherein in the cross-sectional representation it is clear that the first zone 4 forms, over the entire wall, a continuous region made from reinforcing fiber bundles 5 and said zone can be designated as a continuous phase. In contrast, the second zones 7a, 7b, 9, 10 are embedded as discrete regions in the first zone 4. In FIG. 2, in addition to the zones 7a, 7b shown in FIG. 1 on the first surface 2, two additional second zones 9, 10 are represented in the wall interior, which zones are completely surrounded by the first zone 4. The second zones 7a, 7b, 9, 10 are constructed from reinforcing yarn strands 8, 8a, 8b which are arranged over each other in several layers.

The fiber preform shown in FIGS. 1 and 2 has a relatively large thickness. Therefore, in this example, the reinforcing fiber bundles 5 are also oriented substantially isotropically over the wall cross-section in the cross-sectional view.

The invention claimed is:

1. A fiber preform for producing fiber composite structures, the fiber preform comprising:
 a wall made from reinforcing fibers, wherein:
 the wall has a first surface, a second surface lying opposite the first surface and a thickness extending between the surfaces, and is limited by edges,
 the wall comprises at least one first zone made from reinforcing fiber bundles having a first resin composition and at least one second zone made from at least one fiber tape comprising at least one unidirectionally directed reinforcing yarn strand having a second resin composition, the reinforcing fiber bundles in the at least one first zone are oriented in differing spatial directions from each other when viewed in a direction parallel to the thickness extension, each reinforcing fiber bundle comprises reinforcing fiber filaments directed parallel to each other, has a length in a range from 3 to 50 mm, and contains the first resin composition in a concentration in a range from 1 to 10 wt. % relative to a fiber weight, the wall of the fiber preform has a proportion of reinforcing fibers of greater than 35 vol. %, and the at least one second zone forms a discrete region when viewed in a direction perpendicular to the thickness extension of the wall and at least one fiber tape ends with at least one end thereof inside of the wall.

2. The fiber preform according to claim 1, wherein the wall thereof comprises at least two fiber tapes and an orientation of the at least one unidirectionally directed reinforcing yarn strand of at least one fiber tape is different from an orientation of the at least one unidirectionally directed reinforcing yarn strand of another fiber tape.

3. The fiber preform according to claim 1, wherein the at least one unidirectionally directed reinforcing yarn strand of at least one fiber tape is not directed parallel to any of the edges.

4. The fiber preform according to claim 1, wherein the reinforcing fibers of the reinforcing fiber bundles and/or the reinforcing yarn strands of the at least one fiber tape are carbon fibers.

5. The fiber preform according to claim 1, wherein the at least one first zone inside of the wall forms a continuous region formed from reinforcing fiber bundles and the wall comprises at least one discrete second zone arranged in and/or on the continuous region made from reinforcing fiber bundles.

6. The fiber preform according to claim 1, wherein each reinforcing fiber bundle has a length in the range from 10 to 50 mm.

7. The fiber preform according to claim 1, wherein the wall has a plurality of groups of reinforcing fiber bundles having lengths different from each other.

8. The fiber preform according to claim 1, wherein each reinforcing fiber bundle has 500 to 24,000 reinforcing fiber filaments.

9. The fiber preform according to claim 1, wherein the wall has different groups of reinforcing fiber bundles having different numbers of reinforcement fiber filaments from each other.

10. The fiber preform according to claim 1, wherein the wall in the at least one first zone has a proportion of reinforcing fibers of at least 45 vol. %.

11. The fiber preform according to claim 1, wherein the reinforcing fiber bundles contain the first resin composition in a concentration in a range from 2 to 5 wt. % in relation to the fiber proportion.

12. The fiber preform according to claim 1, wherein the at least one fiber tape comprises a plurality of reinforcing fiber strands arranged next to each other.

13. The fiber preform according to claim 1, wherein the at least one fiber tape has a length of at least 7 cm.

14. The fiber preform according to claim 1, wherein the at least one fiber tape has the second resin composition in a concentration from 1 to 10 wt. % in relation to the fiber proportion.

15. The fiber preform according to claim 1, wherein the first resin composition and the second resin composition are identical.

16. A composite component produced from a fiber preform according to claim 1.

17. A composite component, comprising:
a wall constructed from reinforcing fibers embedded in a polymer matrix, wherein:
the wall has a first surface, a second surface lying opposite the first surface and a thickness extending between the surfaces, and is limited by edges,
the wall comprises at least one first zone made from reinforcing fiber bundles and at least one second zone made from at least one fiber tape comprising at least one unidirectionally directed reinforcing yarn strand,
the reinforcing fiber bundles in the at least one first zone are oriented in differing spatial directions from each other when viewed in a direction parallel to the thickness extension,
each reinforcing fiber bundle comprises reinforcing fiber filaments directed parallel to each other and has a length in a range from 3 to 50 mm, wherein the wall has a proportion of reinforcing fibers of greater than 35 vol. %, and
the at least one second zone forms a discrete region when viewed in a direction perpendicular to the thickness extension of the wall and at least one fiber tape ends with at least one end thereof inside of the wall.

* * * * *